(12) United States Patent
Li et al.

(10) Patent No.: US 9,602,942 B2
(45) Date of Patent: Mar. 21, 2017

(54) VOLUME DISPLAY METHOD AND APPARATUS

(71) Applicant: Hisense Co., Ltd., Qingdao, Shandong (CN)

(72) Inventors: Xiaolan Li, Shandong (CN); Xiuxia Cao, Shandong (CN); Yucai Zang, Shandong (CN)

(73) Assignee: Hisense Co., Ltd., Qingdao, Shandong (CN)

( * ) Notice: Subject to any disclaimer, the term of this patent is extended or adjusted under 35 U.S.C. 154(b) by 0 days.

(21) Appl. No.: 14/984,257

(22) Filed: Dec. 30, 2015

(65) Prior Publication Data

US 2016/0286328 A1 Sep. 29, 2016

(30) Foreign Application Priority Data

Mar. 24, 2015 (CN) .......................... 2015 1 0131172

(51) Int. Cl.
*H04R 29/00* (2006.01)
*G06F 3/16* (2006.01)

(52) U.S. Cl.
CPC ........... *H04R 29/008* (2013.01); *G06F 3/165* (2013.01); *H04R 2430/01* (2013.01)

(58) Field of Classification Search
CPC .... H04R 29/008; H04R 2430/01; G06F 3/165
See application file for complete search history.

(56) References Cited

U.S. PATENT DOCUMENTS 7,831,054 B2 * 11/2010 Ball ........................ G06F 3/165
381/104

FOREIGN PATENT DOCUMENTS

JP 02301306 A * 12/1990
JP 2016109620 A * 6/2016

* cited by examiner

*Primary Examiner* — Brenda Bernardi
(74) *Attorney, Agent, or Firm* — Brinks Gilson & Lione

(57) ABSTRACT

The present disclosure provide a volume display method and apparatus for smoothly and flexibly displaying a volume change on the premise of ensuring high time effectiveness and accuracy. The method includes: acquiring a volume value of a first audio input during a current time cycle and a volume value of a second audio input during a previous time cycle; determining volume values to be displayed according to the volume values of the first audio input and the second audio input as well as a volume unit or a threshold of the quantity of volume values to be displayed; determining, according to the quantity of the volume values and duration of the time cycle, a unit display time of volume values to be displayed; sequencing all volume values to be displayed; and successively displaying an image that corresponds to each volume value on a device screen according to the unit display time and the sequence.

20 Claims, 5 Drawing Sheets ic # VOLUME DISPLAY METHOD AND APPARATUS

PRIORITY STATEMENT

This application claims the priority benefit of Chinese Patent Application No. 201510131172.7 filed on Mar. 24, 2015, the disclosure of which is incorporated herein in its entirety by reference.

TECHNICAL FIELD

The present disclosure relates to the field of data processing, and in particular, to a volume display method and apparatus.

BACKGROUND

At present, most of terminal devices on the market are equipped with a voice function, so as to facilitate a user directly entering an anticipated interface by using the voice function, which is operationally convenient. Meanwhile, to better facilitate a user understanding a change in a volume value of a voice input by the user, a voice assistant in an existing terminal device that is equipped with a voice function can generally display, in the form of an image, a volume value of a voice input by a user. In the prior art, a pattern of concentric circles with different radiuses is generally used to indicate a change in the size of a volume value. Specifically, the voice assistant acquires in real time a voice input by a user, and adjusts, according to the size of a volume value of the acquired input voice, the radius of a concentric circle. In this display mode, a change in a volume value of a user's voice may be visually reflected in real time. If the volume value is greater, the radius of a concentric circle is greater and the corresponding concentric circle is larger.

However, when there is a great change between two adjacent volume values of a voice input by a user, that is, a volume value of a voice input by a user is abruptly changed, the size of a concentric circle correspondingly displayed on a display screen of the terminal device is changed sharply, which causes a displayed pattern of a volume value to change surprisingly, leading to poor user experience.

SUMMARY

Embodiments of the present disclosure provide a volume display method and apparatus, so as to achieve smoothly and flexibly displaying a volume change on the premise of ensuring high time effectiveness and accuracy.

To achieve the above objective, the embodiments of the present disclosure adopt the following technical solutions:

According to an aspect of the present disclosure, a volume display apparatus may include a storage medium comprising a set of instructions for displaying volume of an audio signal on a device screen; and a processor configured to communicate with the device screen and the storage medium. When executing the set of instructions, the processor is directed to: acquire a first volume value of a first audio input of an audio signal during a current time cycle, and a second volume value of a second audio input of the audio signal during a previous time cycle of the current time cycle; determine, according to the first volume value and the second volume value, a plurality of intermediate volume values between the first volume value and the second volume value; determine a unit display time associated with the second volume value, the plurality of intermediate volume values, and the first volume value; determine a sequence of the second volume value, the plurality of intermediate volume values, and the first volume value; and successively display a plurality of images on the device screen according to the sequence and the display time, wherein each image corresponds to one of the first volume value, the plurality of intermediate volume values.

According to another aspect of the present disclosure, a method for displaying volume of an audio document on a device screen may include: acquiring, by a volume display apparatus, a first volume value of a first audio input of the audio signal during a current time cycle, and a second volume value of a second audio input of the audio signal during a previous time cycle of the current time cycle; determining, by the volume display apparatus, according to the first volume value and the second volume value, a plurality of intermediate volume values between the first volume value and the second volume value; determining, by the volume display apparatus, a unit display time associated with the first volume value, the plurality of intermediate volume values, and the second volume value; determining, by the volume display apparatus, a sequence of the second volume value, the plurality of intermediate volume values, and the first volume value; and successively displaying, by the volume display apparatus, a plurality of images on the device screen according to the sequence and the display time, wherein each image corresponds to one of the first volume value, the plurality of intermediate volume values.

According to yet another aspect of the present disclosure, a non-transitory processor-readable storage medium may include a set of instructions for displaying volume of an audio signal on a device screen, wherein when the set of instructions is executed by an apparatus in communication with the device screen, the set of instructions directs the apparatus to: acquire a first volume value of a first audio input of an audio signal during a current time cycle, and a second volume value of a second audio input of the audio signal during a previous time cycle of the current time cycle; determine, according to the first volume value and the second volume value, a plurality of intermediate volume values between the first volume value and the second volume value; determine a unit display time associated with the second volume value, the plurality of intermediate volume values, and the first volume value; determine a sequence of the second volume value, the plurality of intermediate volume values, and the first volume value; and successively display a plurality of images on the device screen according to the sequence and the display time, wherein each image corresponds to one of the first volume value, the plurality of intermediate volume values.

According to the volume display method and apparatus provided by the embodiments of the present disclosure, a volume value of a first audio input during a current time cycle and a volume value of a second audio input during a previous time cycle of the current time cycle are acquired; then volume values to be displayed are determined according to the volume value of the first audio input, the volume value of the second audio input and a volume unit or a threshold of the quantity of volume values to be displayed; and a display time of volume values to be displayed is determined according to the quantity of the volume values to be displayed and duration of a time cycle; finally, all volume values to be displayed are sequenced; and then, an image that corresponds to each volume value to be displayed, is successively displayed on a device screen according to the display time of volume values to be displayed and a sequence of all the volume values to be displayed. In this way, two volume values acquired during two adjacent time cycles are switched by means of progressively increasing or reducing through animations, that is, several volume values are inserted at regular intervals into a volume value region between the two volume values acquired during two adjacent time cycles, thereby achieving smoothly and flexibly displaying a volume change on the premise of ensuring high time effectiveness and accuracy.

BRIEF DESCRIPTION OF THE DRAWINGS

To describe the technical solutions of the embodiments of the present disclosure or the existing technology more clearly, the following briefly introduces the accompanying drawings required for describing the embodiments or the existing technology. Apparently, the accompanying drawings in the following description show only some embodiments of the present disclosure, and a person of ordinary skill in the art may still derive other drawings from these accompanying drawings without creative efforts.

DETAILED DESCRIPTION

The following clearly and completely describes the technical solutions in the embodiments of the present disclosure with reference to the accompanying drawings in the embodiments of the present disclosure. Apparently, the described embodiments are merely some of the embodiments of the present disclosure rather than all of the embodiments. All other embodiments obtained by a person of ordinary skill in the art based on the embodiments of the present disclosure without creative efforts shall fall within the protection scope of the present disclosure.

Figure 5:
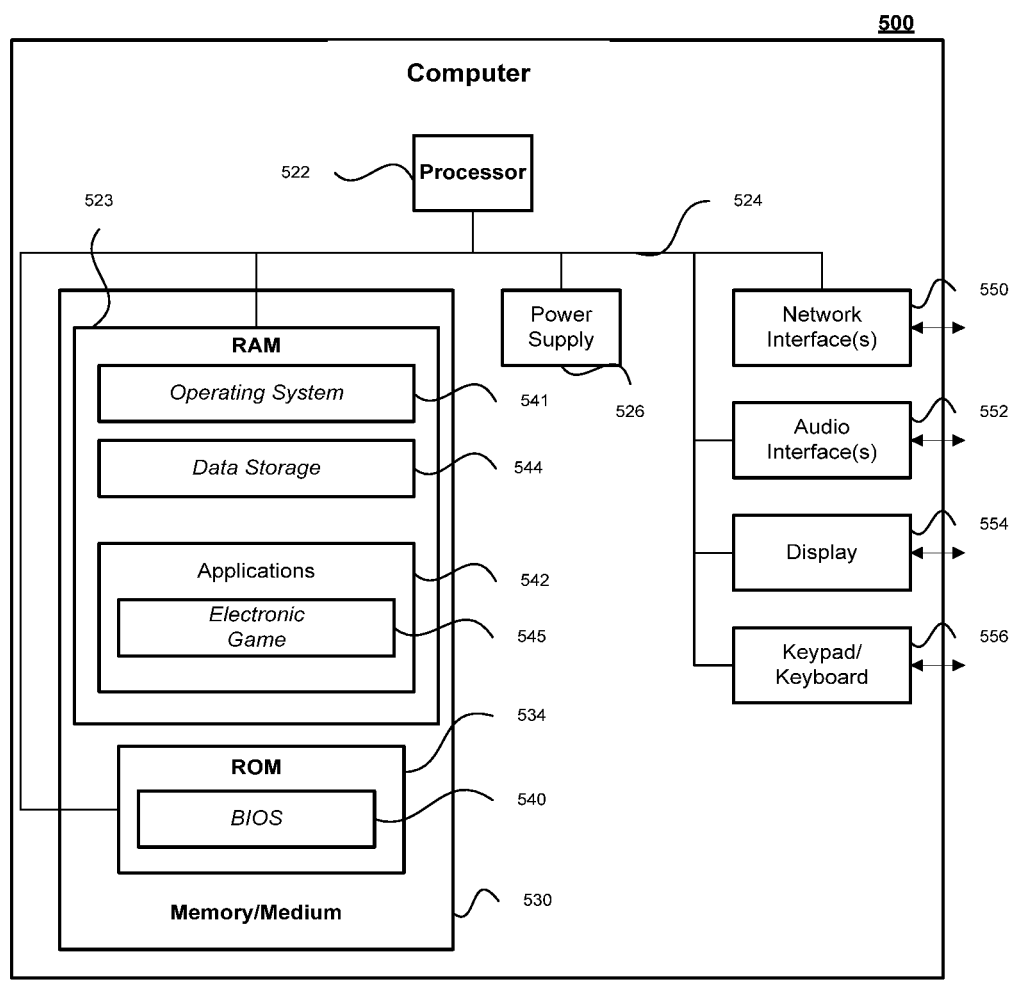
FIG. 5 is a schematic diagram illustrating an exemplary embodiment of an electronic device for implementing methods introduced in the present disclosure.

FIG. 5 is a schematic diagram illustrating an exemplary embodiment of an electronic device for implementing methods introduced in the present disclosure. The electronic device 500 may be a computing device capable of executing a software system. The electronic device 500 may, for example, be a device such as a personal desktop computer or a portable device, such as a laptop computer, a tablet computer, a cellular telephone, or a smart phone.

The electronic device 500 may vary in terms of capabilities or features. Claimed subject matter is intended to cover a wide range of potential variations. For example, the electronic device 500 may include am image processing hardware, such as a camera and/or a webcam. It may also include a keypad/keyboard 556 and a display 554, such as a liquid crystal display (LCD), or a display with a high degree of functionality, such as a touch-sensitive color 2D or 3D display. In contrast, however, as another example, a web-enabled electronic device 500 may include one or more physical or virtual keyboards, and mass storage medium 530.

The electronic device 500 may also include or may execute a variety of operating systems 541. The electronic device 500 may include or may execute a variety of possible applications 542, such as a photo processing application 545. An application 542 may enable communication with other devices via a network, such as communicating with another computer or electronic device 500 via a network.

Further, the electronic device 500 may include one or more non-transitory processor-readable storage media 530 and one or more processors 522 in communication with the non-transitory processor-readable storage media 530. For example, the non-transitory processor-readable storage media 530 may be a RAM memory, flash memory, ROM memory, EPROM memory, EEPROM memory, registers, hard disk, a removable disk, a CD-ROM, or any other form of non-transitory storage medium known in the art. The one or more non-transitory processor-readable storage media 530 may store sets of instructions, or units and/or modules that include the sets of instructions, for conducting operations and/or method steps described in the present disclosure. Alternatively, the units and/or modules may be hardware disposed in the electronic device 500 configured to conduct operations and/or method steps described in the present disclosure. The one or more processors may be configured to execute the sets of instructions and perform the methods and/or operations in exemplary embodiments of the present disclosure.

Merely for illustration, only one processor will be described in electronic devices that execute operations and/or method steps in the following exemplary embodiments. However, it should be note that the electronic devices in the present disclosure may also include multiple processors, thus operations and/or method steps that are performed by one processor as described in the present disclosure may also be jointly or separately performed by the multiple processors. For example, if in the present disclosure a processor of an electronic device executes both step A and step B, it should be understood that step A and step B may also be performed by two different processors jointly or separately in the electronic device (e.g., the first processor executes step A and the second processor executes step B, or the first and second processors jointly execute steps A and B).

Figure 1:
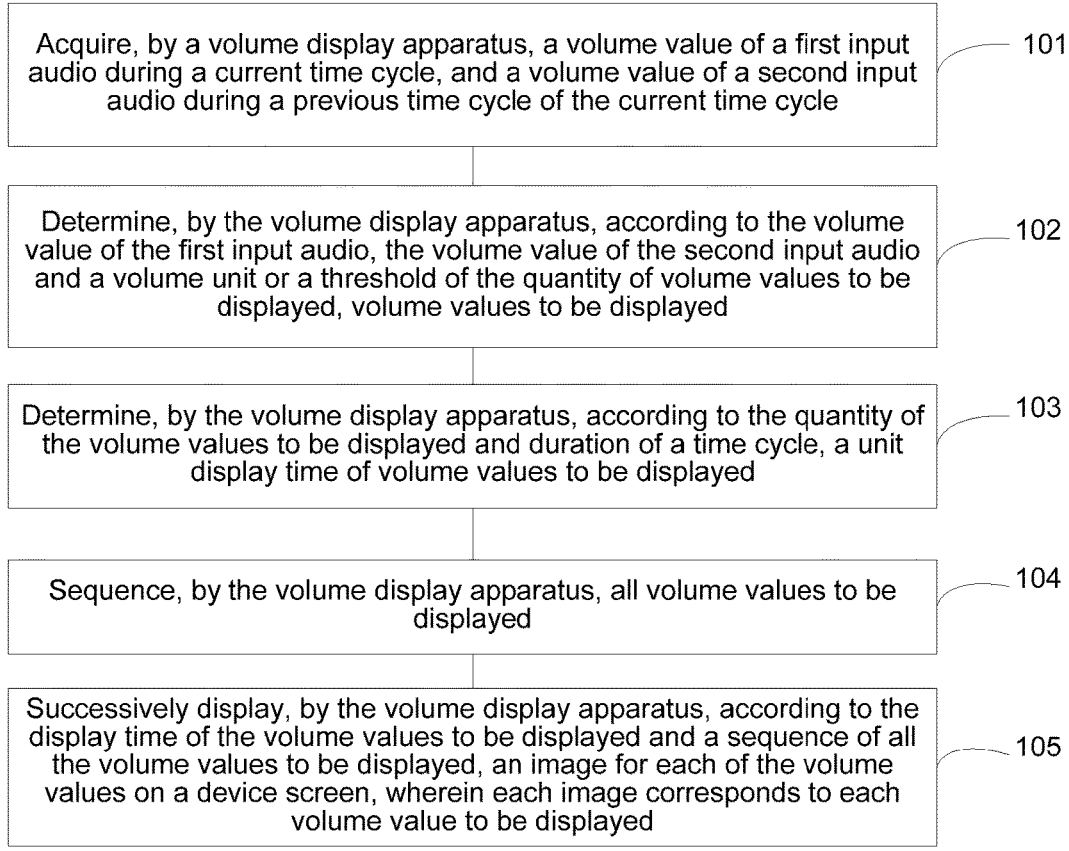
FIG. 1 is a flowchart of a volume display method according to an embodiment of the present disclosure.

FIG. 1 is a flowchart of a volume display method according to an embodiment of the present disclosure. The method may be implemented as a set of instructions and stored in the storage medium 530 of the electronic device 500, which may be a terminal device serving as a volume display apparatus. The processor 522 may execute the set of instructions to perform operations of the method. The operations may include:

101: Acquire, by a volume display apparatus, the volume value of a first audio input during a current time cycle, and a volume value of a second audio input during a previous time cycle of the current time cycle.

In this embodiment, the volume display apparatus is applied in the terminal device, which may be a mobile phone, a tablet computer, a notebook computer, an ultra-mobile personal computer (UMPC), a netbook, a personal digital assistant (PDA), or a television (TV). The volume value of the audio input in step 101 may be acquired by using a microphone that is configured to receive a user's voice. For example, when a user speaks to a microphone in connection with a TV, the microphone may receive the voice from the user, transfer the voice into audio signal, and transmit the audio signal to the TV. Accordingly, the audio input may be the audio signal from the microphone. Alternatively, the audio input may come from a pre-stored audio document, such as a sound track or a video stream from a CD or DVD. Meanwhile, in this embodiment, the volume value of the audio input and a subsequent volume value to be displayed may be displayed by using a device screen of the terminal device. Volume values of audio signals acquired by the volume display apparatus are all positive integers.

In this embodiment, the time cycle may be a time interval for the microphone to feed back an acquired audio signal to the volume display apparatus. Generally, if the time interval is longer, the time effectiveness of the microphone is weaker, thereby causing stagnation of the terminal device when displaying a volume value; otherwise, if the time interval is shorter, the time effectiveness of the microphone is stronger, which accordingly leads to more resource consumption. Therefore, in order to take both time effectiveness and smoothness into account, selection of the time interval (namely, the time cycle) is important. For example, it is considered that the frequency of human eye recognition of animations is 24 frames per second, that is, one frame of animation can be recognized at an interval of 40 ms. However, in specific practical application, the inventor found that, if an animation interval is set as 50 ms, changed values can be basically observed without omission, thereby ensuring time effectiveness. Meanwhile, in specific practical application, the inventor found that, if ten standard volume values are used as an example, volume values are displayed on a device screen of a terminal device within a time interval by means of switching between two frames of animation, that is, the probability of a volume value changing for two times within a time cycle is 80%. Therefore, 100 ms is used as an optimal time cycle in the present disclosure. It should be noted that, 100 ms herein is merely for illustration. For example, in practical application, a value greater than 100 ms may be selected as a value of the time cycle.

Accordingly, an audio signal, such as an audio document (e.g., a sound track from a video or audio stream) or a vocal input from a user (e.g., when the user uses a microphone connected to the volume display apparatus), may be divided into a plurality of consecutive sections on after another, where each section lasts for the predetermined time interval and/or time cycle. The first audio input may be audio information of the audio signal in the current time interval and/or time cycle, and the second audio input may be audio information of the audio signal in the immediate previous time interval and/or time cycle. Obviously, each section of the audio signal includes a volume value thereof.

The volume value may be an average volume value of the section of the audio signal, or may be volume of a specific moment during the time interval and/or time cycle (e.g., the very first, middle, or last moment of the time interval). For example, a volume value of an audio input that is fed back by the microphone to the volume display apparatus in any time cycle, is a volume value of the last input volume that is acquired by the microphone within the time cycle. For example, when microphone input is started, the microphone starts to acquire an audio signal, and stores a volume value of an audio signal currently acquired into a data channel. Each volume value that is subsequently acquired overrides a volume value that is previously stored therein, thereby ensuring that a volume value of an audio signal that is latest acquired is always kept in the data channel. When a set time cycle is reached, the microphone may feed back the volume value of the latest audio signal stored in the data channel to the volume display apparatus.

102: Determine, by the volume display apparatus, according to the volume value of the first audio input, the volume value of the second audio input and a volume unit or a threshold of the quantity of volume values to be displayed, volume values to be displayed.

The volume unit is a volume difference (e.g., an interval volume) between two adjacent volume values to be displayed.

103: Determine, by the volume display apparatus, according to the quantity of the volume values to be displayed and duration of a time cycle, a display time (i.e., a unit display time) of volume values to be displayed.

For example, the volume display apparatus first determines change of volume values and a volume unit according to a volume value of a first audio input and a volume value of a second audio input. For example, if a volume value of a first audio input is n1, a volume value of a second audio input is n2, and a time cycle is T, then the terminal device may determine a quantity of volume values to be inserted between the volume values n1 and n2 according to the volume unit; determine specific volume values of each of the plurality of volume values, insert the plurality of volume values between n1 and n2; and displayed these volume values on a device screen of the terminal device; and then divides, according to the quantity of the volume values to be displayed, a time length of the time cycle. For example, if n1=4, n2=8, and the threshold value is 1, then between the first time cycle and the second time cycle the volume values to be displayed may be 4, 5, 6 and 7. Correspondingly, the display time of each of the displayed volume values (i.e., 4, 5, 6, and 7) is T/4 ms. In addition, as the volume value of the first audio input that corresponds to a current time cycle of the terminal device has not been displayed, the volume value of the first audio input still needs to be included when volume values to be displayed are determined.

It should be noted that, when a time cycle is 100 ms, sampling is performed once every 100 ms, which may cause a condition that two adjacent sampling values are identical (that is, n1=n2). In this case, as no change occurs between the first time cycle and the second time cycle, volume display should have been in a stationary state. Accordingly, visually the displayed volume may appear to be a 100 ms pause between the first time cycle and the second time cycle. In this scenario, the volume display device may add a small fluctuation, such as a fluctuation caused by environmental noise, in the displayed volume to artificially improve the visual effect of the displayed volume. As another example, for the condition that two sampling volume values are identical, the volume display device may display the volume value of an adjacent time cycle between the first and second time cycles, for example, n, n+1, n, or n, n−1, n, to complete the volume display one process of the current time cycle (e.g., the first time cycle). Image replacement needs to be performed twice during the whole process. A time interval of replacement is about 50 ms, and then the total time of the whole process is 100 ms.

104: Sequence, by the volume display apparatus, all volume values to be displayed.

105: Successively display, by the volume display apparatus, according to the display time of the volume values to be displayed and a sequence of all the volume values to be displayed, an image for each of the volume values on a device screen, wherein each image corresponds to each volume value to be displayed. The device screen may be a screen of the volume display apparatus or a screen of a different electronic device in communication with the volume display apparatus.

For example, in this embodiment of the present disclosure, an image that is displayed corresponding to a volume value on a device screen may be a circle pattern. In this case, a circle pattern corresponding to all volume values displayed on the terminal device is a pattern of concentric circles, that is, a pattern of concentric circles that are formed by using a same original point as a center and different sizes of volume values as different radiuses. Certainly, the circle pattern is merely for illustration, and an image that is displayed corresponding to a volume value on a device screen may also be a pattern of water waves, a column pattern, and the like, which is not limited herein.

In this embodiment, the volume display apparatus may successively display, according to the display time of volume values to be displayed, and a sequence obtained after previous sequencing of all volume values to be displayed, volume values to be displayed on a device screen, so as to ensure that a switch from a volume value of a second audio input to a volume value of a first audio input is smoothly performed in a manner of gradual changes within a time cycle, avoiding delay in handling subsequent events. For example, if a volume value is displayed on a device screen in a circle pattern, and the quantity of volume values to be displayed is n, then the terminal device may smoothly display n circle images with radiuses that are successively increased or reduced, at a constant speed within a time cycle.

According to the volume display method provided by this embodiment of the present disclosure, a volume value of a first audio input during a current time cycle and a volume value of a second audio input during a previous time cycle of the current time cycle are acquired; then volume values to be displayed are determined according to the volume value of the first audio input, the volume value of the second audio input and a volume unit or a threshold of the quantity of volume values to be displayed; and a display time of volume values to be displayed is determined according to the quantity of volume values to be displayed and duration of a time cycle; finally, all volume values to be displayed are sequenced; and then, an image that corresponds to each volume value to be displayed, is successively displayed on a device screen according to the display time of volume values to be displayed and a sequence of all the volume values to be displayed. In this way, two volume values acquired during two adjacent time cycles are switched by means of progressively increasing or reducing through animations, that is, several volume values are inserted at regular intervals into a volume value region between the two volume values acquired during two adjacent time cycles, thereby achieving smoothly and flexibly displaying a volume change on the premise of ensuring high time effectiveness and accuracy.

The steps in the above exemplary embodiment are described in an order for illustration purpose only. The steps may also be performed in a different but obvious order to achieve the same technical result. The present disclosure does not intend to limit the order under which the above steps can be performed.

Figure 2:
FIG. 2 is a flowchart of another volume display method according to an embodiment of the present disclosure.
Figure 3:
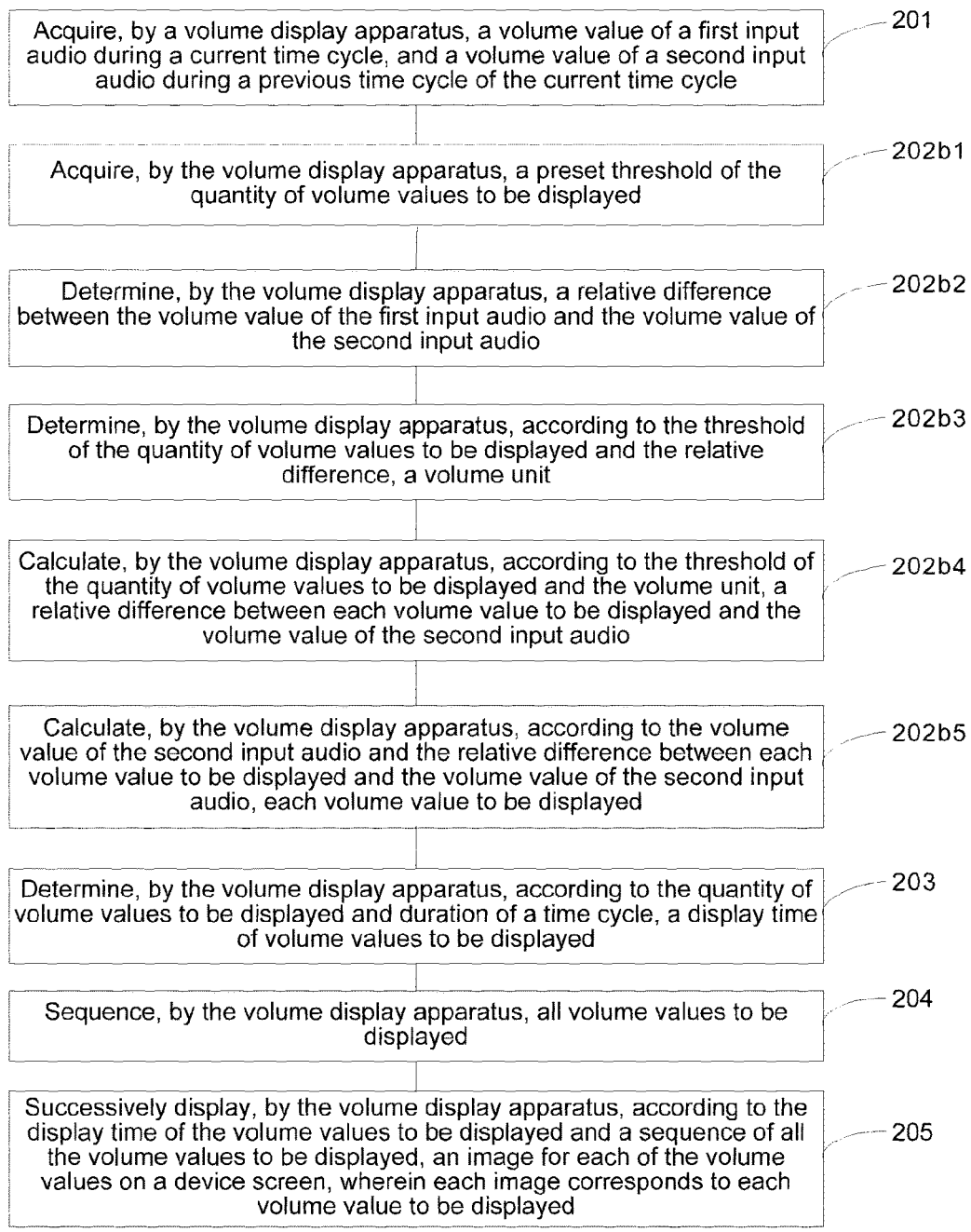
FIG. 3 is a flowchart of still another volume display method according to an embodiment of the present disclosure.

FIG. 2 and FIG. 3 are a flowcharts of other volume display methods according to an embodiment of the present disclosure. The methods may be implemented as sets of instructions and stored in the storage medium 530 of the electronic device 500, which may be a mobile terminal serving as a volume display apparatus. The processor 522 may execute the sets of instructions to perform operations of the method. The operations may include:

201: Acquire, by a volume display apparatus, a volume value of a first audio input during a current time cycle, and a volume value of a second audio input during a previous time cycle of the current time cycle.

The volume display apparatus may be an electronic terminal device similar to that in FIG. 1.

202: Determine, by the volume display apparatus, according to the volume value of the first audio input, the volume value of the second audio input and a volume unit or a threshold of the quantity of volume values to be displayed, volume values to be displayed.

203: Determine, by the volume display apparatus, according to the quantity of volume values to be displayed and duration of a time cycle, a display time of volume values to be displayed.

For example, the determining, by the volume display apparatus, volume values to be displayed that need to be inserted into a region between the volume value of the first audio input and the volume value of the second audio input, may be implemented in the following two implementation manners.

In a first implementation manner, as shown in FIG. 2, when the volume display apparatus determines, according to the volume value of the first audio input, the volume value of the second audio input and a volume unit, volume values to be displayed, step 202 may include the following steps:

202a1: Acquire, by the volume display apparatus, a preset volume unit.

202a2: Determine, by the volume display apparatus, a relative difference between the volume value of the first audio input and the volume value of the second audio input.

202a3: Determine, by the volume display apparatus, according to the volume unit and the relative difference, the quantity of volume values to be displayed.

202a4: Calculate, by the volume display apparatus, according to the quantity of the volume values to be displayed and the volume unit, a relative difference (e.g., an interval volume) between each volume value to be displayed and the volume value of the second audio input.

202a5: Calculate, by the volume display apparatus, according to the volume value of the second audio input and the relative difference between each volume value to be displayed and the volume value of the second audio input, each volume value to be displayed.

For example, if a volume value of a first audio input is n1, a volume value of a second audio input is n2, a time cycle is T, and a preset volume unit is H, then the quantity M of volume values to be displayed is |n1−n2|/H, wherein M is an integer. A relative difference $L_i$ between each volume value to be displayed and n2 is determined according to the volume unit H among volume values to be displayed, that is, $L_i=H*i$ (i=1, 2, and so forth until M). Then, each volume value to be displayed is determined according to n2 and the relative difference $L_i$ between each volume value to be displayed and n2. The display time t of volume values to be displayed is T/M.

In a second implementation manner, as shown in FIG. 3, when the volume display apparatus determines, according to the volume value of the first audio input, the volume value of the second audio input and a threshold of the quantity of volume values to be displayed, volume values to be displayed, step 202 specifically includes the following steps:

202b1: Acquire, by the volume display apparatus, a preset threshold of the quantity of volume values to be displayed.

202b2: Determine, by the volume display apparatus, a relative difference between the volume value of the first audio input and the volume value of the second audio input.

202b3: Determine, by the volume display apparatus, according to the threshold of the quantity of volume values to be displayed and the relative difference, a volume unit.

202b4: Calculate, by the volume display apparatus, according to the threshold of the quantity of volume values to be displayed and the volume unit, a relative difference (e.g., an interval volume) between each volume value to be displayed and the volume value of the second audio input.

202b5: Calculate, by the volume display apparatus, according to the volume value of the second audio input and the relative difference between each volume value to be displayed and the volume value of the second audio input, each volume value to be displayed.

For example, if a volume value of a first audio input is n1, a volume value of a second audio input is n2, a time cycle is T, and a threshold of the quantity of volume values to be displayed is M, calculation is first performed to obtain that a volume unit H among volume values to be displayed is |n1−n2|/M. A relative difference $L_i$ between each volume value to be displayed and n2 is then determined according to the volume unit H among volume values to be displayed, that is, $L_i$=H*i (i=1, 2, and so forth until M). Then, each volume value to be displayed is determined according to n2 and the relative difference $L_i$ between each volume value to be displayed and n2. The display time t of volume values to be displayed is T/M.

Further, step 202a5 and step 202b5 may be specifically implemented through the following process:

a1: Add, by the volume display apparatus, if the volume value of the first audio input is greater than the volume value of the second audio input, the relative difference between each volume value to be displayed and the volume value of the second audio input to the volume value of the second audio input, to obtain each volume value to be displayed.

a2: Subtract, by the volume display apparatus, if the volume value of the first audio input is greater than the volume value of the second audio input, the relative difference between each volume value to be displayed and the volume value of the second audio input from the volume value of the second audio input, to obtain each volume value to be displayed.

For example, if n1>n2, an addition operation is performed on n2 and a relative value $L_i$ between each volume value to be displayed and n2, so as to obtain each volume value to be displayed, (n2+L1, n2+L2, . . . , n2+$L_i$, . . . , n2+$L_M$); and if n1<n2, a subtraction operation is performed on n2 and a relative value L between each volume value to be displayed and n2, so as to obtain each volume value to be displayed, (n2-L1, n2-L2, . . . , n2-$L_i$, . . . , n2-$L_M$).

204: Sequence, by the volume display apparatus, all volume values to be displayed.

For example, step 204 may include the following steps:

204a: Sequence, by the volume display apparatus, if the volume value of the first audio input is greater than the volume value of the second audio input, all volume values to be displayed in ascending order of the size thereof; or sequence, by the volume display apparatus, if the volume value of the first audio input is less than the volume value of the second audio input, all volume values to be displayed in descending order of the size thereof.

205: Successively display, by the volume display apparatus, according to the display time of the volume values to be displayed and a sequence of all the volume values to be displayed, an image for each of the volume values on a device screen, wherein each image corresponds to each volume value to be displayed. The device screen may be a screen of the volume display apparatus or a screen of a different electronic device in communication with the volume display apparatus.

For example, in this embodiment, for technical terms and concepts related to the previous embodiment, reference may be directly made to the previous embodiment. For introduction to the specific implementation manner of step 201 to step 205, reference may also be directly made to specific description of step 101 to step 105 in the previous embodiment. The details are not described herein again.

According to the volume display method provided by this embodiment of the present disclosure, a volume value of a first audio input during a current time cycle and a volume value of a second audio input during a previous time cycle of the current time cycle are acquired; then volume values to be displayed are determined according to the volume value of the first audio input, the volume value of the second audio input and a volume unit or a threshold of the quantity of volume values to be displayed; and a display time of volume values to be displayed is determined according to the quantity of volume values to be displayed and duration of a time cycle; finally, all volume values to be displayed are sequenced; and then, images that each corresponds to each volume value to be displayed, are successively displayed on a device screen according to the display time of volume values to be displayed and a sequence of all the volume values to be displayed. In this way, two volume values acquired during two adjacent time cycles are switched by means of progressively increasing or reducing through animations, that is, several volume values are inserted at regular intervals into a volume value region between the two volume values acquired during two adjacent time cycles, thereby achieving smoothly and flexibly displaying a volume change on the premise of ensuring high time effectiveness and accuracy.

It should also be note that the steps in the above exemplary embodiments are described in certain orders for illustration purpose only. The steps may also be performed in different but obvious orders to achieve the same technical result. The present disclosure does not intend to limit the orders under which the above steps can be performed.

Figure 4:
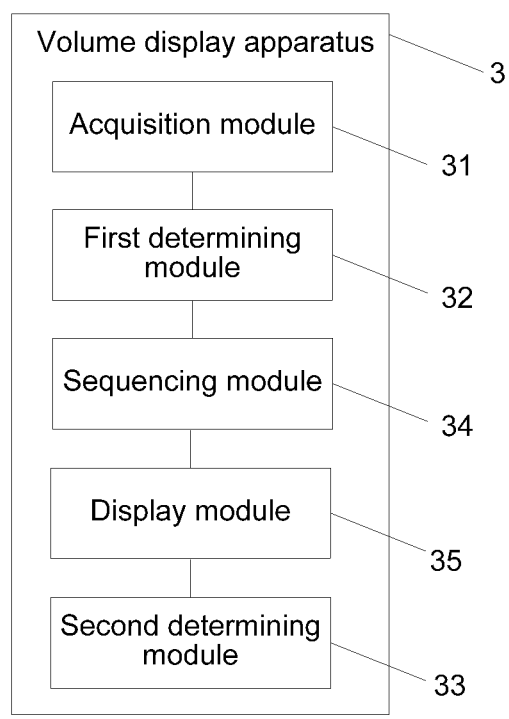
FIG. 4 is a schematic structural diagram of a volume display apparatus according to an embodiment of the present disclosure.

An embodiment of the present disclosure provides a volume display apparatus. As shown in FIG. 4, the volume display apparatus 3 includes an acquisition module 31, a first determining module 32, a second determining module 33, a sequencing module 34, and a display module 35. For example, the volume display apparatus is applied in a terminal device that includes a device screen.

The acquisition module 31 is configured to acquire a volume value of a first audio input during a current time cycle, and a volume value of a second audio input during a previous time cycle of the current time cycle.

The first determining module 32 is configured to determine, according to the volume value of the first audio input and the volume value of the second audio input that are acquired by the acquisition module 31, and a volume unit or a threshold of the quantity of volume values to be displayed, volume values to be displayed, where the volume unit is a volume difference between two adjacent volume values to be displayed.

The second determining module 33 is configured to determine, according to the quantity of volume values to be displayed and duration of a time cycle, a display time of the volume values to be displayed.

The sequencing module 34 is configured to sequence all the volume values to be displayed that are determined by the first determining module 32.

The display module 35 is configured to successively display, according to the display time of the volume values to be displayed that is determined by the second determining module 33, and a sequence of all the volume values to be displayed that is obtained by the sequencing module 34, an image for each of the volume values on a device screen, wherein each image corresponds to each volume value to be displayed. The device screen may be a screen of the volume display apparatus or a screen of a different electronic device in communication with the volume display apparatus.

For example, the first determining module 32 is configured to, when volume values to be displayed are determined according to the volume value of the first audio input and the volume value of the second audio input that are acquired by the acquisition module 31 and a volume unit: acquire a preset volume unit; determine a relative difference between the volume value of the first audio input and the volume value of the second audio input that are acquired by the acquisition module 31; determine, according to the volume unit and the relative difference, the quantity of volume values to be displayed; calculate, according to the quantity of volume values to be displayed and the volume unit, a relative difference between each volume value to be displayed and the volume value of the second audio input; and calculate, according to the volume value of the second audio input and the relative difference between each volume value to be displayed and the volume value of the second audio input, each volume value to be displayed.

For example, the first determining module 32 is configured to, when volume values to be displayed are determined according to the volume value of the first audio input and the volume value of the second audio input that are acquired by the acquisition module 31 and a threshold of the quantity of volume values to be displayed: acquire a preset threshold of the quantity of volume values to be displayed; determine a relative difference between the volume value of the first audio input and the volume value of the second audio input that are acquired by the acquisition module 31; determine, according to the threshold of the quantity of volume values to be displayed and the relative difference, a volume unit; calculate, according to the quantity of volume values to be displayed and the volume unit, a relative difference between each volume value to be displayed and the volume value of the second audio input; and calculate, according to the volume value of the second audio input and the relative difference between each volume value to be displayed and the volume value of the second audio input, each volume value to be displayed.

Further, for example, the first determining module 32 is configured to, when each volume value to be displayed is calculated according to the volume value of the second audio input and the relative difference between each volume value to be displayed and the volume value of the second audio input:

add, if the volume value of the first audio input is greater than the volume value of the second audio input, the relative difference between each volume value to be displayed and the volume value of the second audio input to the volume value of the second audio input, to obtain each volume value to be displayed; or subtract, if the volume value of the first audio input is less than the volume value of the second audio input, the relative difference between each volume value to be displayed and the volume value of the second audio input from the volume value of the second audio input, to obtain each volume value to be displayed.

For example, the sequencing module 34 is configured to: sequence, if the volume value of the first audio input is greater than the volume value of the second audio input, all volume values to be displayed that are determined by the first determining module 32 in ascending order of the size thereof; or sequence, if the volume value of the first audio input is less than the volume value of the second audio input, all volume values to be displayed that are determined by the first determining module 32 in descending order of the size thereof.

According to the volume display apparatus provided by this embodiment of the present disclosure, a volume value of a first audio input during a current time cycle and a volume value of a second audio input during a previous time cycle of the current time cycle are acquired; then volume values to be displayed are determined according to the volume value of the first audio input, the volume value of the second audio input and a volume unit or a threshold of the quantity of volume values to be displayed; and a display time of volume values to be displayed is determined according to the quantity of volume values to be displayed and duration of a time cycle; finally, all volume values to be displayed are sequenced; and then, images that each corresponds to each volume value to be displayed, are successively displayed on a device screen according to the display time of volume values to be displayed and a sequence of all the volume values to be displayed. In this way, two volume values acquired during two adjacent time cycles are switched by means of progressively increasing or reducing through animations, that is, several volume values are inserted at regular intervals into a volume value region between the two volume values acquired during two adjacent time cycles, thereby achieving smoothly and flexibly displaying.

A person skilled in the art can clearly understand that, for convenient and brief description, the above functional modules are only described for exemplary purposes. In actual applications, the functions may be allocated to different functional modules according to specific needs, that is, the internal structure of the apparatus is divided to different functional modules to complete all or some of the above described functions. For the specific work process of the foregoing apparatus and modules, refer to a corresponding process in the foregoing method embodiments. The details are not described herein again.

In the provided embodiments of the present disclosure, it should be understood that, the disclosed apparatus and methods may be implemented by using another manner. For example, the foregoing apparatus embodiment is only for schematic purposes. For example, division of the modules is merely a division of logical functions, and in practical implementation, there may be another division manner. For example, multiple modules or components may be combined as or integrated into another system, or some features may be omitted or not executed. In addition, the functional modules in the embodiments of the present disclosure may be integrated into one processing module, or each of the modules may exist alone physically, or two or more modules may be integrated into one module. The integrated module may be implemented in the form of hardware, or may be implemented in the form of a software functional module.

In the above description, the foregoing embodiments are merely used for describing the technical solutions of the present disclosure, but are not intended to limit the present disclosure. Although the present disclosure is described in detail with reference to the foregoing embodiments, a person of ordinary skill in the art should understand that, modifications may still be made to the technical solutions in the foregoing embodiments, or equivalent replacements may be made to part or all of the technical features; and these modifications or replacements will not cause the essence of corresponding technical solutions to depart from the scope of the technical solutions in the embodiments of the present disclosure.

The invention claimed is:

1. An apparatus, comprising:
a storage medium comprising a set of instructions for displaying volume of an audio signal on a device screen; and
a processor configured to communicate with the device screen and the storage medium,
wherein when executing the set of instructions, the processor is directed to:
acquire a first volume value of a first audio input of an audio signal during a current time cycle, and a second volume value of a second audio input of the audio signal during a previous time cycle of the current time cycle;
determine, according to the first volume value and the second volume value, a plurality of intermediate volume values between the first volume value and the second volume value;
determine a unit display time associated with each of the plurality of intermediate volume values and the first volume value;
determine a sequence of the plurality of intermediate volume values and the first volume value; and
successively display a plurality of images on the device screen according to the sequence and the display time, wherein each image corresponds to one of the first volume value, the plurality of intermediate volume values.

2. The apparatus according to claim 1, wherein to determine the plurality of intermediate volume values the processor is further directed to:
acquire a preset volume unit;
determine a volume difference between the first volume value and the second volume value;
determine, according to the volume unit and the volume difference, a quantity of the plurality of intermediate volume values; and
calculate, according to the second volume value and the volume unit, each of the plurality of intermediate volume values.

3. The apparatus according to claim 1, wherein to determine the plurality of intermediate volume values the processor is further directed to:
acquire a preset quantity of the plurality of intermediate volume values;
determine a volume difference between the first volume value and the second volume value;
determine a volume unit according to the quantity of the plurality of intermediate volume values and the volume difference; and calculate, according to the second volume value and volume unit, each of the plurality of intermediate volume values.

4. The apparatus according to claim 1, wherein when the first volume value is greater than the second volume value, volume values of the sequence of the second volume value, the plurality of intermediate volume values, and the first volume value is monotonic increasing.

5. The apparatus according to claim 1, wherein when the first volume value is less than the second volume value, volume values of the sequence of the second volume value, the plurality of intermediate volume values, and the first volume value is monotonic decreasing.

6. The apparatus according to claim 1, wherein when the first volume value equals the second volume value, volume values of the sequence of the second volume value, the plurality of intermediate volume values, and the first volume value comprises the first volume value and a fluctuation bias value.

7. The apparatus according to claim 6, wherein the fluctuation bias value comprises at least one of
environmental noise; or
a value change comprising an increase from zero to a preselected volume value and a decrease from the preselected volume back to zero.

8. A method for displaying volume of an audio signal on a device screen, comprising:
acquiring, by a volume display apparatus, a first volume value of a first audio input of the audio signal during a current time cycle, and a second volume value of a second audio input of the audio signal during a previous time cycle of the current time cycle;
determining, by the volume display apparatus, according to the first volume value and the second volume value, a plurality of intermediate volume values between the first volume value and the second volume value;
determining, by the volume display apparatus, a unit display time associated with each of the first volume value and the plurality of intermediate volume values;
determining, by the volume display apparatus, a sequence of the plurality of intermediate volume values and the first volume value; and
successively displaying, by the volume display apparatus, a plurality of images on the device screen according to the sequence and the unit display time, wherein each image corresponds to one of the first volume value and the plurality of intermediate volume values.

9. The method according to claim 8, wherein the determining of the plurality of intermediate volume values comprises:
acquiring a preset volume unit;
determining a volume difference between the first volume value and the second volume value;
determining, according to the volume unit and the volume difference, a quantity of the plurality of intermediate volume values; and
calculating, according to the second volume value and the volume unit, each of the plurality of intermediate volume values.

10. The method according to claim 8, wherein the determining of the plurality of intermediate volume values comprises:
acquiring a preset quantity of the plurality of intermediate volume values;
determining a volume difference between the first volume value and the second volume value;
determining a volume unit according to the quantity of the plurality of intermediate volume values and the volume difference; and
calculating, according to the second volume value and volume unit, each of the plurality of intermediate volume values.

11. The method according to claim 8, wherein when the first volume value is greater than the second volume value, volume values of the sequence of the second volume value, the plurality of intermediate volume values, and the first volume value is monotonic increasing.

12. The method according to claim 8, wherein when the first volume value is less than the second volume value, volume values of the sequence of the second volume value, the plurality of intermediate volume values, and the first volume value is monotonic decreasing.

13. The method according to claim 8, wherein when the first volume value equals the second volume value, volume values of the sequence of the second volume value, the plurality of intermediate volume values, and the first volume value comprises the first volume value and a fluctuation bias value.

14. The method according to claim 13, wherein the fluctuation bias value comprises at least one of
environmental noise; or
a value change comprising an increase from zero to a preselected volume value and a decrease from the preselected volume back to zero.

15. A non-transitory processor-readable storage medium, comprising:
a set of instructions for displaying volume of an audio signal on a device screen, wherein when the set of instructions is executed by an apparatus in communication with the device screen, the set of instructions directs the apparatus to:
acquire a first volume value of a first audio input of an audio signal during a current time cycle, and a second volume value of a second audio input of the audio signal during a previous time cycle of the current time cycle;
determine, according to the first volume value and the second volume value, a plurality of intermediate volume values between the first volume value and the second volume value;
determine a unit display time associated with each of the plurality of intermediate volume values and the first volume value;
determine a sequence of the plurality of intermediate volume values and the first volume value; and
successively display a plurality of images on the device screen according to the sequence and the unit display time, wherein each image corresponds to one of the first volume value, the plurality of intermediate volume values.

16. The storage medium according to claim 15, wherein to determine the plurality of intermediate volume values the set of instructions directs the apparatus to:
acquire a preset volume unit;
determine a volume difference between the first volume value and the second volume value;
determine, according to the volume unit and the volume difference, a quantity of the plurality of intermediate volume values; and
calculate, according to the second volume value and the volume unit, each of the plurality of intermediate volume values.

17. The storage medium according to claim 15, wherein to determine the plurality of intermediate volume values the set of instructions directs the apparatus to:
acquire a preset quantity of the plurality of intermediate volume values;
determine a volume difference between the first volume value and the second volume value;
determine a volume unit according to the quantity of the plurality of intermediate volume values and the volume difference; and
calculate, according to the second volume value and volume unit, each of the plurality of intermediate volume values.

18. The storage medium according to claim 15, wherein when the first volume value is greater than the second volume value, volume values of the sequence of the second volume value, the plurality of intermediate volume values, and the first volume value is monotonic increasing.

19. The storage medium according to claim 15, wherein when the first volume value is less than the second volume value, volume values of the sequence of the second volume value, the plurality of intermediate volume values, and the first volume value is monotonic decreasing.

20. The storage medium according to claim 15, wherein when the first volume value equals the second volume value, volume values of the sequence of the second volume value, the plurality of intermediate volume values, and the first volume value comprises the first volume value and a fluctuation bias value.

* * * * *